Nov. 5, 1968 E. KUSSMANN 3,409,476
PROCESS AND COMPOSITION FOR MAKING PROTECTIVE PHOSPHATE COATINGS
Filed April 26, 1965 2 Sheets-Sheet 1

Inventor:
ERICH KUSSMANN
By Burns, Doane, Benedict, Swecker & Mathis
Attorneys

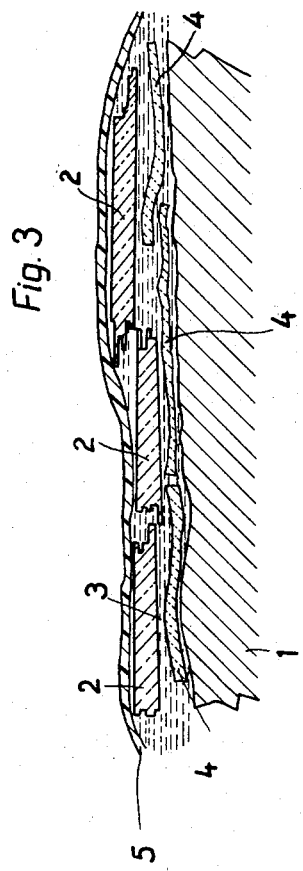

3,409,476
PROCESS AND COMPOSITION FOR MAKING
PROTECTIVE PHOSPHATE COATINGS
Erich Kussmann, Hannover-Hainholz, Germany, assignor
to Firma Ferro-Chemie Dr. Erich Kussmann K.G.,
Hannover, Germany, a company of Germany
Filed Apr. 26, 1965, Ser. No. 450,603
Claims priority, application Germany, Apr. 30, 1964,
F 42,768
8 Claims. (Cl. 148—6.15)

ABSTRACT OF THE DISCLOSURE

A protective layer is provided for ferrous substrates by applying thereto in the cold an aqueous paste containing a mixture of orthophosphoric acid and very finely divided potassium mica flakes in approximately stiochiometric proportions, so as to form an extremely thin, adherent epitaxial growth of crystalline trivalent leucophosphite on the ferrous substrate.

---

Figure 1:

This invention relates to inorganic protective coatings for ferrous surfaces.

Among known processes for producing phosphate layers from pastes for the surface protection of iron and steel surfaces there are those wherein ferrous surfaces are treated with an aqueous solution of phosphoric acid to which are added relatively coarse particles of a sheet or flake mineral such as mica having an average radius or length of the order of magnitude of one millimeter and a thickness of about 100 or more microns. The solid particles serve to buffer the water content of the resulting paste. When a coat of this known paste is applied to a ferrous surface a grayish-white coating is formed which consists essentially of iron phosphate in which comparatively thick individual mica flakes are in close juxtaposition to each other and, being chemically bonded to the surface, are insoluble. Preferably in the prior art the thus treated ferrous articles are coated with a top coat of a lacquer or paint subsequent to their being mechanically finished, in order to provide external protection against corrosion for the completed article. In a more recent process the incorporation of talc, a magnesium compound, has been suggested instead of calcium-containing mineral powder in the formation of protective pastes.

According to the present invention improved protection is provided by a process wherein a permanently stable phosphate coating is produced on the surfaces of iron and steel articles at ambient temperature, e.g., between 5° and 45° C. Coatings produced in accordance with the present invention impart not only extraordinary chemical resistance to the treated surface, but represent a particular improvement in terms of outstanding resistance to continual mechanical stresses, such as those caused by abrasion, by thermal expansion, or by combinations of such effects.

The essence of the invention is based on the recognition that corrosion resistant layers applied either as coatings or as diffusion layers in accordance with prior practice tend to lead to notch cracks or crevices under stress because of the difference between their texture or structure and the structure of the objects to be protected. Consequently, the intrinsic shortcomings of this type or surface protection can be greater than their advantages, particularly when the surfaces of the coated metallic articles are subjected in use to vibrational stresses. These stresses tend to induce fatigue faster in the harder phosphate layer or elongated surface than in the metallic structure of the object to be protected. Metallic articles treated by means of surface diffusion, i.e., such objects having a content of carbide, boride, or nitrite in the surface, are especially susceptible to the formation of such notch type crevices. In such cases the surface subjected to diffusion treatment becomes harder and, in addition, because of the heat treatment which usually accompanies such diffusion, a structural change takes place.

The difficulties mentioned above can be avoided according to the present invention by depositing on iron or steel surfaces an extremely thin protective film of a thin, non-viscous paste which contains extremely fine flakes of potassium mica dispersed in an aqueous solution of orthophosphoric acid. The paste is applied by a cold process, without any high temperature treatment. This process produces an epitaxial growth of a tertiary iron phosphate, more specifically in the oriented form of a lattice or skeleton of closely adjacent or abutting leuco-phosphite crystals. The individual crystals, grown epitaxially on a ferrous surface are, according to performed measurements, of substantial magnitude, i.e., from about 10 to 30 microns long and about 5 to 10 microns wide (1 micron=$10^{-3}$ mm.). The thickness of these grown crystals, on the other hand, amounts to only about 5 to 10 millimicrons (1 millimicron=$10^{-6}$ mm.).

The epitaxial layer can be grown very fast on the surfaces of clean iron and steel articles according to this invention. The resulting layer is practically indestructible by known rust initiators and behaves like the surface of the metal itself when bent or deformed by means of known bending or oscillation devices.

Notch crevices could not be detected in the treated samples after weeks of bend stress tests even when examined under an electron microscope. Similarly favorable results were obtained when the samples were subjected to hammering, both at room and at very elevated temperatures.

In practicing the invention, a paste is formed by mixing or dispersing extremely finely ground flakes of potassium mica, i.e., a mica which consists essentially of potassium, aluminum silicate and hydroxyl groups, in aqueous orthophosphoric acid, e.g., a liquid having a density of about 86 Be.'. The predominant or major part of the mica flakes used should have a radius or length no greater than about 100 microns, preferably 50 microns or less. The paste desirably contains about 7.5 to 15% orthophosphoric acid and about 12 to 20% potassium mica. The paste should preferably also contain iron oxide ($Fe_2O_3$), e.g., about ⅓ to 1 part per part of $H_3PO_4$ of $Fe_2O_3$ powder having an average particle size no greater than the mica and preferably even finer than the mica. For instance, ferric oxide powders having a particle size in the millimicron range, e.g., 70 millimicrons, are well known and are well suited for use in the present invention. Upon application of such a paste to a ferrous substrate an epitaxial growth of leuco-phosphite lattice crystals is formed on the substrate beneath the mica particles. Suitable potassium micas include muscovite, biotite and phlogopite. On the other hand, sodium micas such as paragonite are not suitable for use in the present invention because the sodium atoms result in an unsatisfactory crystal structure, one of the essential features of the present invention being believed to lie in the adsorption of the mica particles by van der Waals forces on and at a proper distance from the substrate surface. Only when potassium mica particles are used are the requisite conditions produced which give the desired effect by means of ionic and atomic exchanges and form a thin, flexible surface structure or crystal network of the kind illustrated in FIG. 3 of the drawing.

The effectiveness of the present invention can be further improved by stabilizing the epitaxial growth or formation of the desired leuco-phosphite layer from the lattice crystals by incorporating in the novel coating composition a small quantity of a water-repellent, insoluble, firmly adherent, synthetic plastic material, initially in liquid form. For instance, commercially available aqueous dispersions of polyvinyl acetate, and particularly dispersions containing polyvinyl acetate and about 30 to 70% (based on the resin) of a phosphoric acid ester as a plasticizer, e.g. tritesyl or tricresyl phosphate, have been found very effective. The phosphate ester not only plasticizes the resin but also makes it more compatible with the aqueous phosphate paste. Optionally, one may also include in the coating composition a small amount of a conventional wetting or dispersing agent and a stabilizer or inhibitor. Among commercially available agents of this sort which have been successfully used in practicing the present invention are "Acetothio" (which is made by heating thiourea with acetone in the presence of a small or catalytic amount of HCl) and "Feradco" (which is a mixture of sulfite pulp liquor, ammonium sulfite pulp liquor, formaldehyde, rhodanammonium and hexamethylene tetramine). The incorporation of 2 to 10%, e.g., 5%, of potassium iodide in the novel paste composition is also sometimes advantageous.

A paste composition embodying the present invention typically should be formulated as follows:

Orthophosphoric acid ($H_3PO_4$) _____ 7.5 to 15%.
Ferric oxide red _____ 0 to 10%, preferably 2 to 5%.
Potassium mica _____ 12 to 20%.
Adhesive plastic material such as resinous polyvinyl acetate, in water dispersible form _____ 0 to 25%, preferably 12 to 20%.
Wetting or emulsifying agent suitable for use in acid medium _____ 0 to 3%, preferably 1 to 2%.
Water _____ Balance (preferably about 50–150 parts per 100 parts solids).

Compositions containing a water/solids ratio of about 50/50 and an aqueous phosphoric acid phase of about 86 Bé. density are particularly preferred. The plastic material when included helps to fix the reactants in place during the growth period.

In some instances it is advantageous to replace the ferric oxide partially or totally by a mixture of magnetite ($Fe_3O_4$) and of flame soot or carbon black.

The incorporation of the very fine flakes of potassium mica in dilute orthophosphoric acid promotes adhesion on the metal surface. By ion exchange the adsorbed layer is rapidly transformed within the smallest space and proceeding along the very short distances, into a leucophosphite epitaxial growth which forms between the metal surface and the extremely tightly adjacent surface of the mica flakes. The ferrous phosphate, freshly precipitated by orthophosphoric acid, is converted through oxidation into a trivalent ferric phosphate of the leuco-phosphite type.

It is important for the flakes of potassium mica to become fixed to their places of sorption during the reaction period in order that the desired effect be obtained. Strictly speaking, the potassium mica particles or flakes which are prepared to effect the crystal growth or network must remain stationary within their sorption layer of orthophosphoric acid in order that the orthokinetic reaction may be promptly completed. To this end the formulation is applied as a thin layer of paste. As already stated, the incorporation in such a paste of small quantities of a water insoluble, water-repellent, plastic material, e.g., polyvinyl acetate, is advantageous in this connection.

Next some specific examples are given to further illustrate the present invention. Unless otherwise indicated, all percentages and proportions of materials are expressed on a weight basis throughout this specification.

EXAMPLE 1

The following formulation of an aqueous coating composition is illustrative of one embodiment of the invention:

Percent
Orthophosphoric acid ($H_3PO_4$), fine powder _____ 15
Potassium mica, flakes of muscovite, particle size about 10 to 50 microns _____ 15
Polyvinyl acetate (water dispersible powder, containing 50% tricresyl phosphate) _____ 12
Ferric oxide, fine powder _____ 5
Water _____ Balance

EXAMPLE 2

A paste formulated as indicated below represents another good embodiment of the invention:

Percent
Orthophosphoric acid ($H_3PO_4$), fine powder _____ 7.3
Potassium mica, fine flakes _____ 18
Plastic material, e.g., aqueous dispersion containing 40% polyvinyl acetate solids, (solids) _____ 24
Water _____ Balance The liquid and solid constituents are present in the paste in a weight ratio of about 50/50.

The technical improvement achieved by the present invention, particularly as reflected by the unusually improved physical and mechanical properties of the treated surfaces, is illustrated by the following data.

The coating composition of Example 1 was applied to the surface of a strip of sheet steel at room temperature (25° C.). After letting the water evaporate, the dry coated strip was then mechanically rotated in a 3% aqueous sodium chloride solution at the rate of 1,000 r.p.m. for several hours daily over a 40-day period without showing any symptoms of corrosion.

A similarly protected strip of steel sheet was exposed to a gas flame and heated until the accumulation of maximum heat. Where it was thus directly affected by the heat of the flame the protective layer lost its original red color and became brown-black. When thereafter quenched in cold water its original red color was completely restored. Microscopic examination revealed no disturbance or change of the surface in comparison to its original condition prior to flame treatment. The leuco-phosphite layer appears to be indestructible for all practical purposes.

A similarly protected sample was struck with a steel ball with moderate impact for 2 to 3 minutes until a condensation or densification of the crystalline layer took place. The flattening of the cleaved crystal layer by subsequent polishing changes this result or condition. The repellent property of the sample against humidity and atmospheric pollution is thereby reinforced.

In the laboratory it was feasible to scrape portions of the epitaxial growth of leuco-phosphite crystals off newly treated ferrous surfaces and to examine them under an electron microscope.

The accompanying drawing illustrates two different configurations of crystals sketched from the corresponding electron micrographs.

Figure 2:
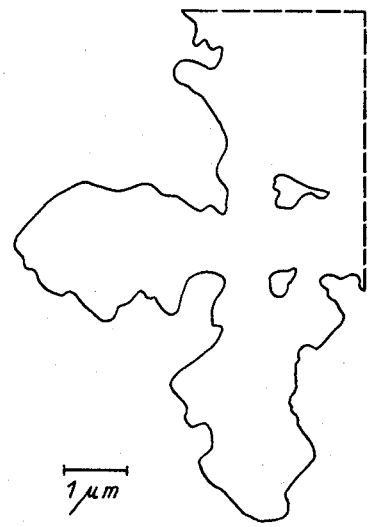

More specifically, FIG. 1 shows an individual crystal skeleton (the scale in millimicrons being shown for reference);

FIG. 2 shows a portion of a cross-linked or interlaced crystal network or lattice, on the same scale as in FIG. 1; and FIG. 3 is a sketch showing a practical embodiment of the invention.

In FIG. 3 the surface of a ferrous body 1 is shown in considerable enlargement. On the surface of this body is shown, similarly enlarged, a thin layer consisting mainly of potassium mica in individual oriented thin flakes 2 and of orthophosphoric acid 3. This dissolves potassium atoms from the mica as well as elemental iron Fe from the ferrous body 1 and/or from the very fine $Fe_2O_3$ particles which may be present, thereby leading to the formation of leuco-phosphite crystals 4. The resulting epitaxial intergrowth of lattice crystals 4 which occurs within an interval of about 30 to 60 minutes can be additionally protected by including in the paste a synthetic plastic material which is compatible with water and capable of forming a top surface film 5 which serves to fix the constituents 1, 2, 3 and 4 against orthokinetic or random movement.

For the electron microscope examination the crystals were suspended in a 0.01 N ammonia solution and shaken for 24 hours in mechanical shakers. The crystals were also subjected to considerable bending stresses of the kind generated by supersonic devices, which stresses arise when a single, flat, solid lattice crystal is located partially in an oscillation node and simultaneously also partially at an amplitude of the oscillations. The crystals showed no change, such as surface cracks or breaks, either after 24 hours of mechanical shaking or even after subsequent 10-minute treatment in a supersonic vibrator. Microdiffraction images demonstrate the presence of leuco-phosphite, i.e., a cubic potassium-containing ferric phosphate, which apparently derives its potassium content from the potassium mica. The conditions for the epitaxial growth of these crystals on iron and steel surfaces are determined in two directions by the very similar crystal characteristics or reticular plane distances of leuco-phosphite and of alpha-iron, with which the difference of the d-values is about 4% and about 8%, respectively, namely, for leuco-phospite in direction [110] over alpha-iron in direction [100] as well as for the leuco-phosphite [333] parallel to iron [111].

Surprisingly, it has been noted that progress of the growth or crystal network formation, which is invisible to the naked eye, can be readily followed by measuring the acidity at the treated iron or steel surfaces. At the start of the process the pH value is 1, gradually rising to the range between 3.4 and 5, and eventually after 14 days to 7. Excess paste which may be initially applied to or painted or sprayed on a clean metal article or structure, such as a bridge, in a thickness of the order of about 1 to 2 millimeters, can be gently brushed or wiped off as soon as the pH value is within the 3.4 to 5 range, which stage is usually reached within about ½ hour to 1 hour after initial application of the paste to the metal. Thereafter the lattice crystals become self-nucleating and grow from the small amount of remaining constituents until neutrality (pH 7) is reached. Any loose residue may then be thoroughly wiped off to facilitate subsequent painting with conventional pigmented paint. In other words, the principal phase of the novel process takes place under ordinary atmospheric conditions within approximately the initial ½ hour to 1 hour period, whereafter the process proceeds to completion in an automatic, self-sustaining after-phase which may extend over a period of 1 to 2 or more days, somewhat depending on ambient conditions.

Particularly when the steel base is coated with a conventional topcoat of paint, the present invention, used as a primer treatment, gives additional effective and lasting protection to the protected steel surface against subsequent formation of rust under the paint.

The subject matter of this invention is particularly pointed out in the appended claims.

I claim:

1. Process for producing a protective layer on a ferrous substrate
    which comprises applying to said substrate at ambient temperature a thin layer of an aqueous paste containing a mixture of about 7.5 to 15% orthophosphoric acid, about 2 to 10% finely divided ferric oxide and about 12 to 20% finely divided flakes of potassium mica predominantly having a particle size smaller than 100 microns, whereby the water evaporates from the applied paste and the resulting precipitated ferrous phosphate oxidizes to form on said substrate a thin, adherent epitaxial growth layer of crystalline trivalent iron leuco-phosphite.

2. A process according to claim 1 wherein said aqueous paste also comprises dispersed therein 12 to 25% of a water repellent, water insoluble, adhesive synthetic plastic material to enhance adhesion of the leuco-phosphite layer to the substrate.

3. A process according to claim 1 wherein said aqueous paste also comprises dispersed therein 12 to 25% of an adhesive polyvinyl acetate resin plasticized with a phosphoric acid ester.

4. A process according to claim 1 wherein said aqueous paste is applied as a coating to the ferrous substrate at a temperature between about 15° and 40° C. and excess paste is thereafter removed when the pH of the applied coating rises into the range between about 3.4 and 5.

5. An aqueous paste for the protection of ferrous surfaces which comprises about 7.5 to 15% orthophosphoric acid ($H_3PO_4$), about 12 to 20% finely divided potassium mica flakes, about 2 to 5% finely divided ferric oxide, and about 12 to 20% of a water-dispersible, water-repellent, adhesive polyvinyl resin, the weight ratio of solid constituents to water in said composition being between about 65 to 150 parts per 100.

6. A composition according to claim 5 which further comprises about 0.5 to 10% potassium iodide.

7. A composition according to claim 5 which contains the ferric oxide as $Fe_2O_3$.

8. A composition according to claim 5 which contains the ferric oxide in the form of $Fe_3O_4$ and further contains carbon black.

References Cited

UNITED STATES PATENTS

| | | | |
|---|---|---|---|
| 1,341,100 | 5/1920 | Allen | 148—6.15 |
| 2,492,095 | 12/1949 | Gifford | 148—6.15 |
| 2,636,257 | 4/1953 | Ford | 148—6.15 X |
| 2,835,618 | 5/1958 | Keller et al. | 148—6.15 X |
| 3,244,656 | 4/1966 | Mejer | 148—6.15 X |

FOREIGN PATENTS 687,599    2/1953    Great Britain.

RALPH S. KENDALL, *Primary Examiner.*